No. 865,617. PATENTED SEPT. 10, 1907.
C. P. STEINMETZ.
INDUCTION MOTOR.
APPLICATION FILED AUG. 7, 1905.
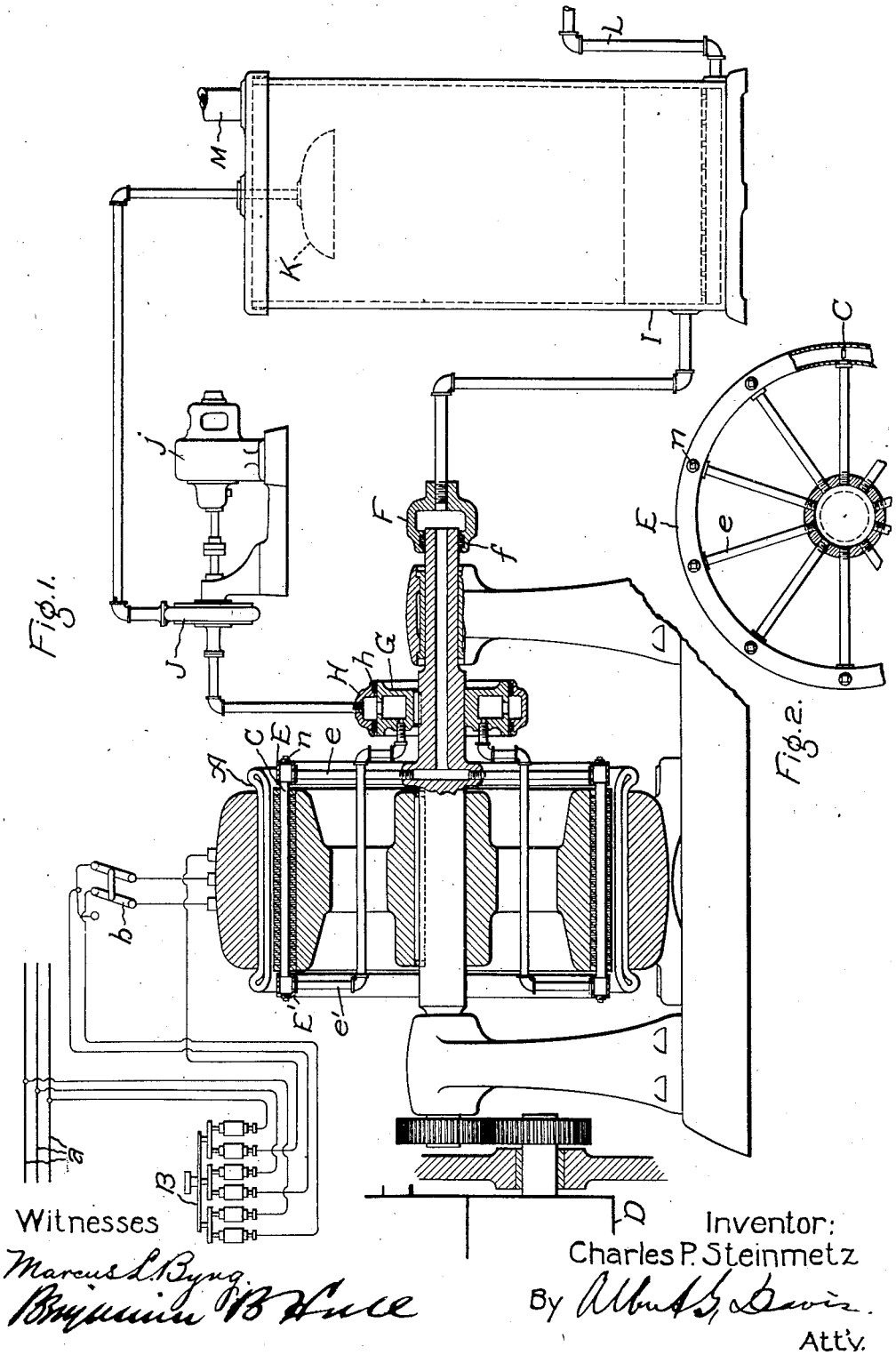
Witnesses
Marcus L. Byng.
Benjamin B. Hull
Inventor:
Charles P. Steinmetz
By Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

INDUCTION-MOTOR.

No. 865,617.     Specification of Letters Patent.     Patented Sept. 10, 1907.

Application filed August 7, 1905. Serial No. 272,981.

*To all whom it may concern:*

Be it known that I, CHARLES P. STEINMETZ, a citizen of the United States, residing at Schenectady, county of Schenectady, and State of New York, have invented certain new and useful Improvements in Induction-Motors, of which the following is a specification.

My invention relates to electric motors, and its object is to provide a novel form of motor suited for driving heavy loads, such as rolling mills, which must be frequently and rapidly reversed. For such work electric motors as heretofore built are not suitable. Rolling mills must ordinarily be reversed every three or four seconds. This prohibits the use of any complicated switching mechanism, for the time is insufficient for the operation of anything but a simple reversing switch. Any motor which depends for its reversal on the reversal of field magnetism would in large sizes require too much time to be available. The momentum of the motor must be as small as possible; that is, the rotor must have a small diameter. Direct-current motors are not satisfactory on account of difficulties in commutation and of the high momentum such motors possess. If an induction motor is employed, it is not ordinarily possible to use an external variable resistance, since there is not time for operating the rheostat. Furthermore, the rotor diameter of such a motor without artificial cooling is large, making the inertia and the power wasted in reversal very high.

In order to avoid the above-mentioned difficulties I provide an induction motor having a short-circuited secondary member of very high resistance, preferably so high that the maximum torque occurs at or about negative synchronism, so that the motor can exert its greatest torque at the instant of reversal, and I arrange artificial means for cooling the secondary conductors in order to take care of the great amount of heat generated by the resistance-drop therein. By using artificial cooling the conductors may be small, the rotor diameter small, and the inertia low.

My invention comprises a number of features for adapting a motor for operation in the manner set forth above, which features will be specifically pointed out in the appended claims.

My invention will best be understood by reference to the accompanying drawings, in which Figure 1 shows somewhat diagrammatically a cross-sectional side-elevation of an induction motor arranged in accordance with my invention; and Fig. 2 shows an end view of an end ring.

In the drawing, A represents the primary winding of the motor, which is connected to a suitable source of polyphase current, indicated at $a$, through the main switch B and reversing switch $b$. The reversing switch is indicated merely diagrammatically, and it will be understood that any well-known type of switch adapted for handling large currents or high voltages may be employed for this purpose. The rotor structure of the motor carries near its periphery a plurality of hollow bars C, which are electrically connected by end-rings E and E' so as to form a squirrel-cage winding. The rotor is mechanically connected by gears or other suitable connections to the rolls D of the rolling mill or other member to be driven. The conductors C are designed with a very high electrical resistance so as to enable the motor to exert its maximum torque during reversal. This also allows the motor to vary its speed automatically to a certain extent with varying load. The end-rings E and E' provide not only electrical connections between like ends of the hollow secondary conductors C, but also form pipe connections so that if the end-rings are connected in a fluid system, the fluid will pass from one end-ring through the conductors to the other ring. In order to secure an equal distribution of fluid in the several conductors, these conductors are formed so as to offer a high frictional resistance to the flow of fluid. For this end, they are preferably formed flat with a rectangular cross-section, as indicated in Fig. 2.

The end-ring E is provided with a plurality of hollow spokes $e$ extending radially inward and opening into a common passage, which extends through the center of the shaft to a coupling F. This coupling or joint is provided with a packing ring $f$ so as to be water-tight, and at the same time to permit relative rotation of the two parts of the joint or coupling. The stationary portion of the coupling is connected by a pipe to a condenser I, which forms a reservoir for the cooling fluid below the level of the rotor. The other end-ring E' is connected through similar hollow radial spokes to a chamber G, which is provided with a joint or coupling H. This joint or coupling is also provided with packing rings $h$ so that it is water-tight, while permitting relative rotation of these parts. The stationary portion of the coupling is piped to a suction pump J, which I have indicated as of the centrifugal type driven in any suitable manner, as by an electric motor $j$. By placing the reservoir below the level of the rotor and using a suction pump, the fluid passes through the motor under a partial vacuum, so that a leaky joint merely admits air to the pipes instead of allowing the fluid to escape.

In order that the fluid may be used repeatedly, I connect the suction pump J to the condenser I, which is provided with a suitable jet K.

L represents a pipe connection from a source of compressed air, and M represents the exhaust for the evaporated water or steam. The condenser I acts as an ordinary jet condenser. Obviously, other forms of condenser may be employed, or if a large supply of water is at hand, no condenser at all is required.

In order that the passages through the hollow conductors C may be cleaned to prevent them from being stopped up by the formation of scale, I provide removable plugs $n$ opposite the ends of these conductors.

I do not desire to limit myself to the particular construction and arrangement of parts here shown, but aim in the appended claims to cover all modifications which are within the scope of my invention.

What I claim as new, and desire to secure by Letters Patent of the United States, is,—

1. In an induction motor, a secondary winding comprising hollow conductors of high resistance, a pipe connection from one end of said conductors to a fluid reservoir, and a pipe connection from the other end of said conductors to a suction pump.

2. In an induction motor, a secondary winding comprising hollow conductors of high resistance, said conductors being adapted to offer a high frictional resistance to the flow of fluid therethrough, a pipe connection from one end of said conductors to a fluid reservoir, and a connection from the other end of said conductors to a suction pump.

3. In an induction motor, a secondary structure comprising a plurality of hollow bars of high electrical resistance, hollow end-rings forming both electrical and pipe connections between like ends of all of said bars, a pipe connection from one of said rings to a fluid reservoir, and a pipe connection from the other ring to a suction pump.

4. In an induction motor, a rotor structure, hollow bars of high electrical resistance carried at the periphery of said structure, hollow end-rings forming both electrical and pipe connections between like ends of all of said bars, a set of hollow spokes extending radially inward from each of said end-rings and opening into a common passage, piping from a cooling fluid system extending to said passages, and water-tight joints between said passages and said piping adapted to permit relative rotation of the two parts of the joints.

5. In an induction motor, a rotor structure, hollow bars of high electrical resistance carried at the periphery of said structure, hollow end-rings forming both electrical and pipe connections between like ends of all of said bars, a set of hollow spokes extending radially inward from each of said end-rings and opening into a common passage, piping extending from said passages to a fluid reservoir and to a suction pump respectively, and water-tight joints between said passages and said piping adapted to permit relative rotation of the two parts of the joints.

6. In an induction motor, a secondary structure comprising a plurality of hollow bars of high electrical resistance, hollow end-rings forming both electrical and pipe connections between like ends of all of said bars, means for forcing a cooling fluid to pass from one end-ring through said bars to the other end-ring, and removable plugs in said end-rings opposite the ends of said bars.

7. In combination with an induction motor having a secondary winding comprising hollow high resistance conductors, a cooling system comprising a fluid reservoir below the level of said motor, pipe connections from said reservoir to said hollow conductors, and a suction pump connected to the other end of said conductors.

8. In combination with an induction motor having a secondary winding comprising hollow high resistance conductors, a cooling system comprising a fluid reservoir below the level of said motor, pipe connections from said reservoir to said hollow conductors, a suction pump connected to the other end of said conductors, and a condenser receiving the discharge from said pump.

In witness whereof, I have hereunto set my hand this 4th day of August, 1905.

CHARLES P. STEINMETZ.

Witnesses:
BENJAMIN B. HULL,
MABEL E. HULL.